Patented Sept. 30, 1924.

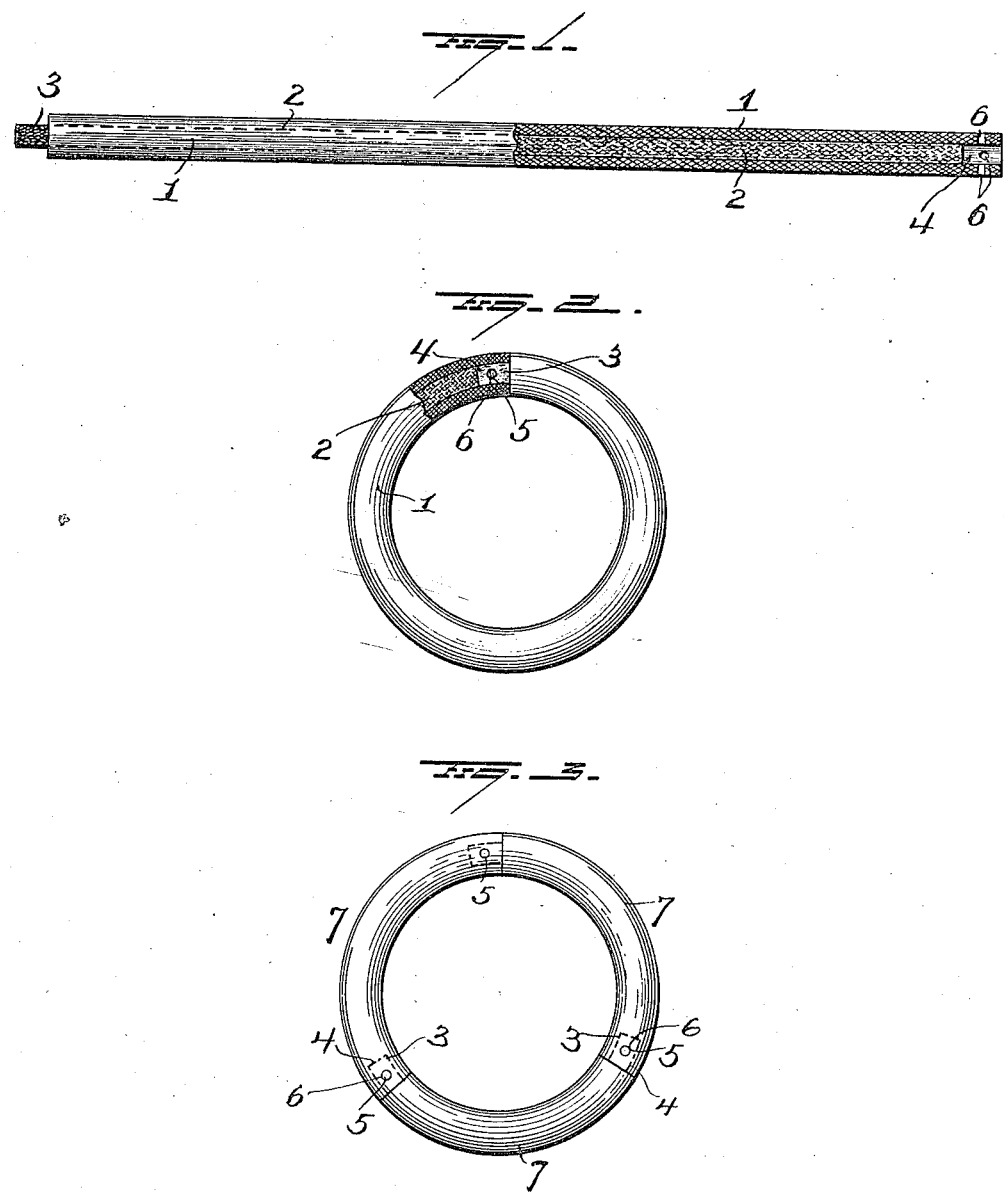

1,510,215

UNITED STATES PATENT OFFICE.

LOUIS FRITZ, OF MEMPHIS, TENNESSEE.

TIRE.

Application filed August 15, 1922. Serial No. 581,966.

*To all whom it may concern:*

Be it known that I, LOUIS FRITZ, a citizen of the United States, and a resident of Memphis, in the county of Shelby and State of Tennessee, have invented certain new and useful Improvements in Tires; and I do hereby declare the following to be a full, clear, and exact description of the invention, such as will enable others skilled in the art to which it appertains to make and use the same.

This invention relates to improvements in tires and more particularly to those of the "cushion" type,—one object of the invention being to so construct a cushion tire for a vehicle wheel that the same may be adjusted in a manner to provide a plurality of wearing faces.

A further object is to so construct a cushion tire that when a portion thereof shall have become worn, it may be turned in such manner as to displace such worn portion by a fresh or unworn portion of said tire, and thereby prolong the active life of the tire.

A further object of the invention is to provide a cushion tire which shall be simple in construction, and cheap to manufacture and which shall be durable and efficient.

With these and other objects in view, the invention consists in certain novel features of construction as hereinafter set forth and pointed out in the claims.

In the accompanying drawings:

Figure 1 is a view partly in section and partly in elevation showing a tire structure embodying my improvements.

Figure 2 is a view in elevation and partly in section showing the structure embodied in Figure 1, bent into circular form to fit the rim of a wheel, and having its ends secured together, and Figure 3 is a view in elevation illustrating a modification.

In constructing my improved adjustable tire, I employ a tube 1 of rubber or a suitable composition containing rubber, and into this tube a core or filling 2 of fibrous material, such as cotton, is forced while the tube is straight as shown in Figure 1.

At one end, the cotton core 2 is made to project beyond the end of the tube to provide a tongue 3 and said core terminates inwardly from the opposite end of the tube to provide a socket 4 to receive said tongue when the tire structure is bent into circular form as shown in Figure 2,—the two ends of the structure being secured together by means of a removable pin or key 5 passing transversely through the end portion of the tube and through said tongue,—said tube being provided with a plurality of pairs of holes 6 for the accommodation of said pin, so that the ends of the tire structure may be secured together in such manner that the connecting pin shall not be in line with the portion of the tire which constitutes the tread in any position to which the tire may be adjusted.

In the embodiment of the invention shown in the drawings, the tube is shown as being circular in cross-section, but it will be understood that said tube may be made with a plurality of exterior flat wearing faces if desired.

With my improvements, when a portion of the tire shall have become worn, the tire ends may be disconnected, and after said tire shall have been straightened so as to assume the form shown in Figure 1, it may be given a partial turn and then again bent to the circular position shown in Figure 2, when a new tread surface will be presented. Thus it will be seen that the tire is capable of being adjusted so that at least eight different portions thereof may be made to constitute, successively, tread portions and the life of the tire will in this manner be greatly prolonged.

Instead of making the tire of a single tube and continuous core, the said tire may comprise a plurality of cored sections 7 constructed in the manner previously explained and secured together to form the circular tire, as illustrated in Figure 3.

Various changes might be made in the details of construction of my invention without departing from the spirit thereof or limiting its scope and hence I do not restrict myself to the precise details herein set forth.

Having fully described my invention what I claim as new and desire to secure by Letters Patent, is:

1. A tire comprising a tube of resilient material, a core extending through said tube and maintaining it against collapse, and removable means for securing the ends of the tube together whereby different portions of its exterior may be disposed in position to constitute a tread.

2. A tire comprising an elastic tube, a fibrous core therein, one end of the core projecting beyond the corresponding end of the tube to constitute a tongue and the opposite end of the core being short of the corresponding end of the tube whereby the last-mentioned end of the tube will constitute a tongue-receiving socket, and a fastening device inserted through the socket end of the tube and the tongue received therein, the tube being provided with a series of transverse openings to receive said fastening device whereby different portions of the surface of the tube may be at times so disposed as to constitute a tread.

In testimony whereof, I have signed this specification in the presence of two subscribing witnesses.

LOUIS FRITZ.

Witnesses:
GEORGE F. DOWNING,
S. G. NOTTINGHAM.